United States Patent

Nickel

[11] Patent Number: 6,116,271
[45] Date of Patent: Sep. 12, 2000

[54] VENTING VALVE FOR A FUEL TANK

[75] Inventor: Hans Nickel, Cottenweiler, Germany

[73] Assignee: Firma Andreas Stihl AG & Co., Germany

[21] Appl. No.: 09/307,099

[22] Filed: May 7, 1999

[30] Foreign Application Priority Data

May 8, 1998 [DE] Germany ................ 198 20 540

[51] Int. Cl.[7] ........................... F16K 17/196
[52] U.S. Cl. ................ 137/508; 137/859; 137/907
[58] Field of Search ................ 137/508, 859, 137/907

[56] References Cited

U.S. PATENT DOCUMENTS

| | | | |
|---|---|---|---|
| 2,219,408 | 10/1940 | Benz et al. | 137/508 X |
| 4,089,349 | 5/1978 | Schenk | 137/859 |
| 5,409,035 | 4/1995 | Scott et al. | 137/510 |
| 5,526,843 | 6/1996 | Wolf et al. | 137/550 |

FOREIGN PATENT DOCUMENTS

| | | |
|---|---|---|
| 2 398 244 | of 0000 | France. |
| 2 717 881 | of 0000 | France. |
| 1 853 051 | of 0000 | Germany. |
| 43 10 040 | of 0000 | Germany. |
| 4-173236 | of 0000 | Japan. |
| 4-173258 | of 0000 | Japan. |
| 2 088 023 | of 0000 | United Kingdom. |

*Primary Examiner*—Stephen M. Hepperle
*Attorney, Agent, or Firm*—Robert W. Becker & Associates

[57] ABSTRACT

A venting valve for a fuel tank of a working tool driven by an internal combustion engine has a pressure compensation channel connecting the fuel tank interior to the surrounding atmosphere. A valve seat and a diaphragm are provided for closing off the pressure compensation channel when the diaphragm is seated on the valve seat. The diaphragm is lifted off the valve seat to open the pressure compensation channel when vacuum is present in the fuel tank interior. The valve seat is located at a first side of the diaphragm facing away from the fuel tank interior. The diaphragm has a central opening arranged centrally relative to the valve seat. A support plate is positioned at a second side of the diaphragm facing the fuel tank interior. It covers the deflecting area of the diaphragm and supports the diaphragm. The support plate has a sealing bead positioned in alignment with the valve seat. The spring forces the support plate and the diaphragm against the valve seat.

20 Claims, 2 Drawing Sheets

VENTING VALVE FOR A FUEL TANK

BACKGROUND OF THE INVENTION

The present invention relates to a venting valve for a liquid container, especially for a fuel tank of a working tool such as a motor chain saw, a cutter, a trimmer etc., having an internal combustion engine. The venting valve has a pressure compensation channel connected to the interior of the container which can be closed by a valve body seated sealingly on the valve seat. The valve body is lifted off the valve seat when vacuum is present in the interior of the container to thereby open the pressure compensation channel.

Venting valves for fuel tanks are known in many embodiments. For example, German Offenlegungsschrift 43 29 876 discloses a valve body which is comprised of rubber-elastic material and is shaped like a mushroom, whereby the outer edge of the mushroom head is sealingly positioned on the valve seat. In order to ensure venting of the interior of the container at minimal vacuum, the valve body must be embodied such that it is soft-elastic. However, this entails the problem that at greater vacuum the valve body will yield greatly and will be deformed so that leaks may occur.

Furthermore, the minimal closing forces of the mushroom-shaped valve body at normal pressure entail the risk that residues, foreign matter (dirt particles) etc., present on the valve seat, will prevent proper closing or opening of the mushroom-shaped valve body.

It is therefore an object of the present invention to improve a venting valve of the aforementioned kind such that it opens already at minimal vacuum to allow venting, while at high (excess) pressure it is reliably closed without mechanical overload.

SUMMARY OF THE INVENTION

This object is inventively solved in that a valve body in the form of a diaphragm is provided. The valve seat is arranged at the side of the diaphragm which faces away from the interior of the container. The diaphragm has a substantially centrally positioned opening that is arranged approximately at the center of the valve seat. The diaphragm is supported at the side facing the interior of the container by a support plate which covers the deflecting portion of the diaphragm. The diaphragm support plate further has a sealing bead that is congruent to the valve seat. The diaphragm support plate is held in contact at the valve seat by a spring.

The embodiment of the valve body as a diaphragm allows for a freely selectable constructive design which ensures opening of the diaphragm already at minimal vacuum. At high pressures, the diaphragm can be supported over a large surface area so that damage of the valve is prevented. The support plate arranged at the side of the diaphragm facing the interior of the container ensures that, when vacuum is present, the support plate has a greater effective surface then when high (excess) pressure exists. This difference in the force transmission thus ensures opening already at minimal vacuum and ensures a high roadability at high pressure.

The support plate is secured by a spring in abutment at the valve seat whereby the spring is expediently a coil spring that is preferably positioned in a channel portion of the pressure compensation channel that has a larger diameter than the remaining portion of the pressure compensation channel. The central axis of the coil spring is positioned substantially perpendicularly to the plane of the support plate which is supported without any further guiding means at the coil spring. It preferably rests freely on the facing end of the coil spring.

The controlled valve is positioned substantially centrally to the diaphragm whereby the central opening of the diaphragm is positioned at the center of the valve seat. For enhancing the sealing action of the diaphragm at the valve seat, it is suggested to provide the membrane support plate with a sealing bead that is substantially aligned with or congruent to the valve seat.

The inventive embodiment of the venting valve allows the use of simple plastic foils, technical plastic foils, household foils etc., as the valve-forming diaphragm.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
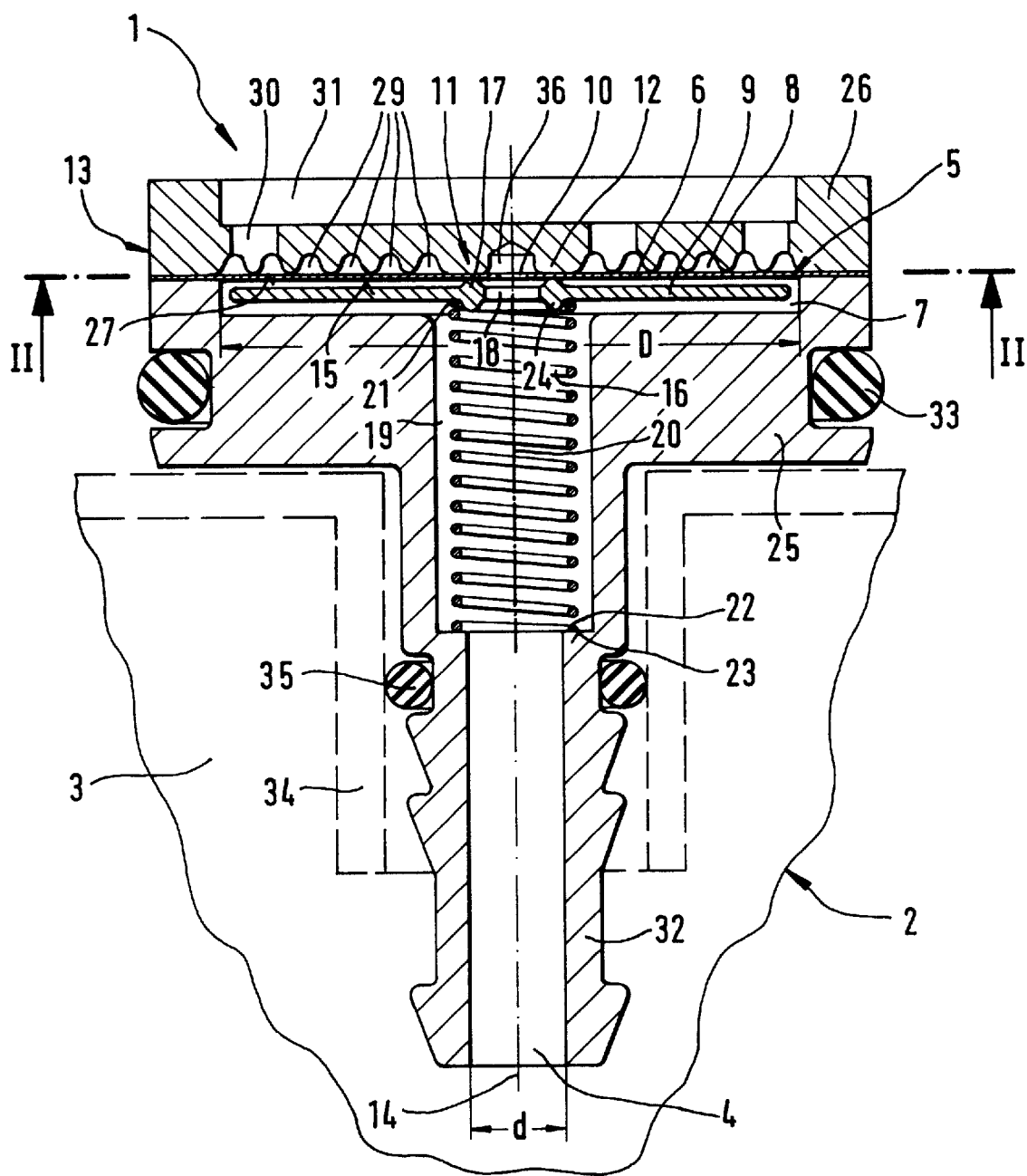
FIG. 1 shows a section of the venting valve inserted into the venting opening of the fuel tank.
Figure 2:
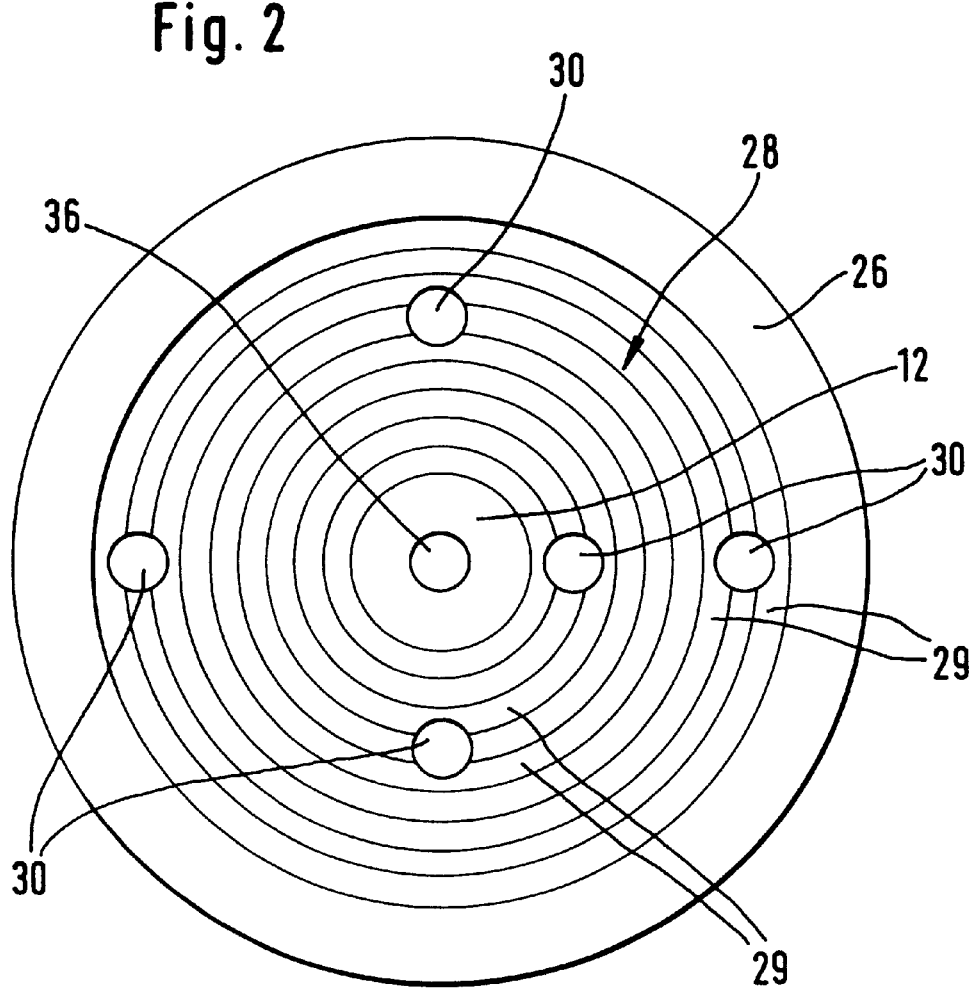
FIG. 2 shows a section along the line II—II of FIG. 1.
Figure 3:
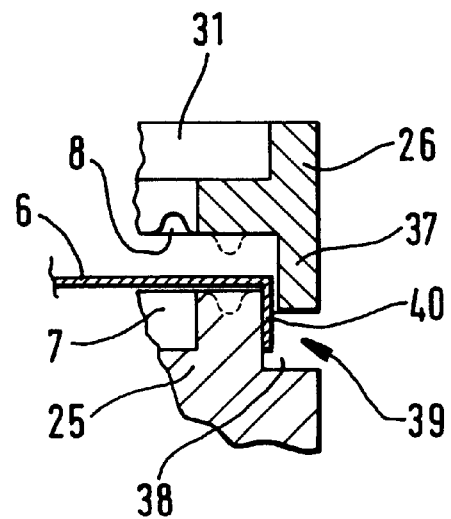
FIG. 3 shows an enlarged representation of an embodiment of the edge of the valve chamber.

The present invention will now be described in detail with the aid of several specific embodiments utilizing FIGS. 1–4.

The inventive venting valve 1 is designed for venting a liquid container, especially a fuel tank 2 of the kind commonly used for internal combustion engines that drive working tools such as motor chain saws, a cutter, a trimmer etc. A pressure compensation channel 4 opens into the interior 3 of the fuel tank 2 and, in the shown embodiment, communicates with the surrounding atmosphere. The pressure compensation channel 4 ends in a valve chamber 5 having a diameter D that is multiple times greater than the diameter d of the pressure compensation channel 4. In the valve chamber 5 a diaphragm 6 is arranged that divides the valve chamber 5 into a pressure chamber 7, connected via the compensation channel 4 to the interior of the fuel tank 2, and into a venting chamber 8 that, in the shown embodiment, is connected to the surrounding atmosphere. The chambers 7 and 8 are connected to one another by a central opening 10 which is substantially centrally arranged in the diaphragm 6.

At the side of the venting chamber 8 opposite the diaphragm 6, a valve seat 12 is arranged which is part of an outlet valve 11 that opens when vacuum is present. The valve seat 12 has coordinated therewith the diaphragm 6 functioning as a valve body. The valve seat 12 embodied at the housing 13 of the venting valve 1 is positioned substantially centrally to the diaphragm 6 whereby the central opening 10, in the direction of the longitudinal center axis 14, is positioned approximately at the center of the valve seat 12. Expediently, the diaphragm 6 has a sealing bead which is positioned aligned with or substantially congruent to the valve seat 12.

The side 15 of the diaphragm 6 facing the fuel tank interior 3 is supported on a support plate 9 which extends substantially over the entire cross-sectional area of the pressure chamber 7. The support plate 9 serves as a supporting means for the diaphragm 6, whereby the diaphragm 6 can be lifted off the support plate 9. The support plate 9 is secured by a spring, preferably a coil spring 16, in contact at the valve seat 12 whereby the support plate 9 at the end face facing the diaphragm side 15 is provided with an annular bead 17 that is positioned in the longitudinal direction of the longitudinal center axis 14 approximately aligned to the valve seat 12 and forces the diaphragm 6 securely against the valve seat 12. In order to maintain the central opening 10 between the pressure chamber 7 and the venting chamber 8 in an open position, the support plate 9 is embodied such that a central opening 18 is provided which is positioned within the area surrounded by the sealing bead 17. The opening 18 is preferably greater than the central opening 10.

The coil spring 16 is positioned expediently coaxially to the longitudinal center axis 14 in a widened (greater diameter) channel portion 19 of the pressure compensation channel 4. The central axis 20 of the coil spring 16 is positioned perpendicularly to the plane of the support plate 9.

The support plate 9 is loosely supported on the facing end 21 of the coil spring 16 whereby the other end 22 is supported at the step 23 of the widened channel portion 19. In order to ensure that the free facing end 21 of the coil spring 16 does not slip relative to the support plate 9 positioned thereon, it is expedient to provide a securing bead 24 which engages the open end 21 of the coil spring 16 and thus securely prevents slipping of the support plate 9 radially to the longitudinal center axis 14.

The diaphragm 6 is secured between a base body 25 of the venting valve 1 and a cover 26 that encloses the valve chamber 5. The valve seat 12 is embodied at the cover 26, and the annular surface 28 surrounding the valve seat 12 at the inner side 27 of the cover 26 facing the diaphragm 6 is of a non-planar design. Preferably, the annular surface 28 of the cover 26 is provided with annular grooves 29 concentrically arranged relative to the valve seat 12. The cover 26 has a plurality of venting bores 30 which are preferably arranged in an irregular pattern about the cover 26 of the valve chamber 5. In the shown embodiment, the venting bores 30 open directly into the surrounding atmosphere. In order to prevent penetration of dust, dirt, etc., the cover 26 has an outer recess 31 for insertion of a filter element or filter fleece. Since the venting bores 30 all open into this recess 31, they are all covered by the filter element positioned therein so that exclusively filtered air will enter into the venting chamber 8.

In order to ensure a uniform venting action of the venting chamber 8, even when the diaphragm 6 rests at the inner side 27, the venting bores 30 are arranged such that they intercept respectively two adjacently positioned annular grooves 29 so that the annular grooves 29 are connected to one another. The arrangement of the venting bores 30 is preferably such that the venting bores 30 connect all of the annular grooves 29 to one another.

The venting valve 1 has an outer sealing ring 33 provided at the head of the base body 25 which will become effective when the head of the housing 13 of the venting valve 1 is inserted into a correspondingly matched opening of a liquid container (fuel tank). In the shown embodiment, the connecting socket 32 forming the pressure compensation channel 4 is inserted into the venting sleeve 34 of a fuel container (fuel tank) 2, whereby the connecting socket 32 has an outer sealing ring 35 for sealing it relative to the connecting sleeve 34 in a gas and liquid tight manner.

When high pressure is built up in the fuel tank interior 3, the diaphragm 6 will lift off the support plate 9 and will come to rest at the inner side 27 of the cover 26. The support plate 9 is sealingly pressed by the spring force of the coil spring 16 against the valve seat 12. An effective surface of the diaphragm 6 which corresponds to the area of the annular bead 17 will build up an additional force that corresponds to the high pressure present within the interior 3. With a substantially defined closing force, the diaphragm 6 is sealingly secured at the diaphragm support plate 9, respectively, its annular bead 17, so as to seal off the valve at the valve seat 12 of the cover 26.

When vacuum is present, the diaphragm 6 will come to rest at the support plate 9, whereby the venting bores 30 will ensure easy removal from the cover 26. When the diaphragm 6 rests substantially completely on the support plate 9, the entire support plate surface is effective and the vacuum will build up a force that counteracts the force of the coil spring 16. The annular bead 17 lifts off the valve seat 12 whereby, due to the vacuum that is present, the diaphragm 6 will lift off at the same time and the central opening 10 will be freed. The opening 10 has a diameter that is smaller than the diameter of the annular valve seat 12. In order to ensure a safe lifting of the membrane from the valve seat 12, within the valve seat 12 a blind bore 36 is provided. Via the venting bores 30 filtered air will flow into the fuel tank interior 3 for pressure compensation.

It should be noted that in the inventive venting valve the diaphragm support surfaces that are effective during high pressure and vacuum have a different size. When high pressure is present, the diaphragm 6 will lift off the support plate 9 so that only a minimally effective surface is provided which corresponds substantially to the contact surface of the annular bead 17 at the diaphragm 6, respectively, at the valve seat 12. When vacuum is present, the diaphragm 6 will rest on the support plate 9 so that the entire diaphragm support surface area is effective. Accordingly, already for a minimal vacuum within the fuel tank interior 3, a safe opening of the outlet valve 11 counter to the force of the coil spring 16 is possible.

The diaphragm 6 may be in the form of a simple industrial foil, for example, a polyethylene foil. The inventive venting valve 1 is also functional with conventional household foil, for example, even aluminum foil. It is important that the diaphragm 6 that divides the valve chamber 5 is securely and sealingly held at the circumferential edge. For this purpose, the cover 26 has an edge portion 27 which engages a matching recess 38 at the base body 25 (see FIG. 3). In the area 39 of the edge portion 37 the cover 26 can be secured at the base body 25 by interposition of the edge 40 of the diaphragm 6 by connecting methods such as welding, gluing, pressing, snap-on mounting etc.

The connecting socket 32 has expediently an outer slanted step structure (see FIG. 1) so that a hose end can be securely slipped onto the connecting socket. The hose end can then be connected with a corresponding venting socket of the liquid container so that an arrangement of the venting valve at any desired location at the working tool is possible.

The specification incorporates by reference the disclosure of German priority document 198 20 540.6 of May 8, 1998.

The present invention is, of course, in no way restricted to the specific disclosure of the specification and drawings, but also encompasses any modifications within the scope of the appended claims.

What is claimed is:

1. A venting valve for a fuel tank (2) of a working tool driven by an internal combustion engine, said venting valve comprising:

a pressure compensation channel (4) connecting a fuel tank interior (3) to the surrounding atmosphere;

a valve seat (12) and a diaphragm (6) closing off said pressure compensation channel (4) when seated on said valve seat (12);

wherein said diaphragm (6) is lifted off said valve seat (12) to open said pressure compensation channel (4) when vacuum is present in the fuel tank interior (3);

said valve seat (12) located at a first side of said diaphragm (6) facing away from the fuel tank interior (3);

said diaphragm (6) having a central opening (10) arranged centrally relative to said valve seat (12);

a support plate (9), positioned at a second side (15) of said diaphragm (6) facing the fuel tank interior (3), covering the deflecting area of said diaphragm (6) and supporting said diaphragm (6);

said support plate (9) having a sealing bead (17) positioned in alignment with said valve seat (12);

a spring (16) forcing said support plate (9) in a direction toward said valve seat (12).

2. A valve according to claim 1, wherein said diaphragm (6) is liftable off said support plate (9).

3. A valve according to claim 1, wherein said spring (16) is a coil spring, wherein said pressure compensation channel (4) has a radially widened channel portion (19) and wherein said coil spring is coaxially arranged in said channel portion (19).

4. A valve according to claim 3, wherein said coil spring (16) has a central axis (20) positioned perpendicularly to a plane of said support plate (9).

5. A valve according to claim 1, wherein said support plate (9) is supported by said spring (16).

6. A valve according to claim 5, wherein said support plate (9) rests freely on a facing end of said spring (16).

7. A valve according to claim 5, wherein said support plate (9) has a securing bead (24) engaging an open facing end (21) of said spring (16).

8. A valve according to claim 1, comprising a valve chamber (5) in which said support plate (9) is arranged, wherein said valve chamber has a diameter (D) that is a multiple of a diameter (d) of said pressure compensation channel (4).

9. A valve according to claim 8, wherein said diaphragm (6) divides said valve chamber (5) into a pressure chamber (7) connected to the fuel tank interior (3) and into a venting chamber (8), wherein said pressure chamber (7) and said venting chamber (8) are connected to one another by said central opening (10).

10. A valve according to claim 8, further comprising a cover (26) closing off said valve chamber (5), wherein said valve seat (12) is connected to said cover (26).

11. A valve according to claim 10, wherein said cover (26) has an inner surface area (28) surrounding said valve seat (12), wherein said inner surface area (28) has a non-planar surface.

12. A valve according to claim 11, wherein said inner surface area (28) has annular grooves (29) concentrically arranged relative to said valve seat (12).

13. A valve according to claim 12, wherein said cover (26) has at least one venting bore (30) connecting said valve chamber (5) to the surrounding atmosphere.

14. A valve according to claim 13, wherein a plurality of said venting bores (30) are arranged in an irregular pattern across said cover (26).

15. A valve according to claim 13, wherein said at least one venting bore (30) connects said annular grooves (29) to one another.

16. A valve according to claim 15, wherein said at least one venting bore (30) connects two neighboring ones of said annular grooves (29).

17. A valve according to claim 13, wherein said cover (26) comprises a filter element covering said at least one venting bore (30).

18. A valve according to claim 1, wherein said valve seat (12) is ring-shaped and wherein a diameter of said central opening (10) is smaller than a diameter of said valve seat (12).

19. A valve according to claim 1, wherein said diaphragm (6) consists of a plastic foil.

20. A valve according to claim 19, wherein said foil is a polyethylene foil.

* * * * *